US012741850B2

(12) United States Patent
Cheah et al.

(10) Patent No.: US 12,741,850 B2
(45) Date of Patent: Sep. 22, 2026

(54) ENHANCED PROXIMITY ALERT SYSTEM AND METHOD

(71) Applicant: RAM Lifting Technologies Pte. Ltd., Singapore (SG)

(72) Inventors: Chun Wei Cheah, Singapore (SG); Abdul Rashid Bin Arifin, Singapore (SG); Ghee Hua Ng, Singapore (SG)

(73) Assignee: RAM LIFTING TECHNOLOGIES PTE. LTD, Singapore (SG)

( * ) Notice: Subject to any disclaimer, the term of this patent is extended or adjusted under 35 U.S.C. 154(b) by 0 days.

(21) Appl. No.: 19/137,991

(22) PCT Filed: Dec. 12, 2023

(86) PCT No.: PCT/SG2023/050828
§ 371 (c)(1),
(2) Date: Jun. 11, 2025

(87) PCT Pub. No.: WO2024/128979
PCT Pub. Date: Jun. 20, 2024

(65) Prior Publication Data
US 2026/0015207 A1 Jan. 15, 2026

(30) Foreign Application Priority Data
Dec. 12, 2022 (SG) ............................ 10202260415S

(51) Int. Cl.
*G08B 3/00* (2006.01)
*B66C 15/06* (2006.01)
*G08B 21/02* (2006.01)

(52) U.S. Cl.
CPC ............ *B66C 15/065* (2013.01); *G08B 21/02* (2013.01)

(58) Field of Classification Search
CPC ....... B66C 15/065; B66C 1/101; G08B 21/02; G08B 21/22
(Continued)

(56) References Cited

U.S. PATENT DOCUMENTS 6,208,260 B1 * 3/2001 West .................. G08B 21/0213 340/567
6,838,996 B2 * 1/2005 Deimel ................... B66C 15/06 340/7.49
(Continued)

FOREIGN PATENT DOCUMENTS

CN 114634112 6/2022
KR 10-2019-0130772 11/2019
(Continued)

OTHER PUBLICATIONS

Patent Cooperation Treaty; PCT/SG2023/050828; Apr. 23, 2024, International Search Report and Writen Opinion.

*Primary Examiner* — Tai T Nguyen
(74) *Attorney, Agent, or Firm* — Morgan, Lewis & Bockius LLP

(57) ABSTRACT

A method for detecting whether a tag is proximate to a spreader, the method comprising the steps of: detecting the tag by a sensing device mounted to the spreader; locating the tag in a danger zone relative to the spreader, and then; activating a danger zone alarm to an operator of the spreader; if the tag is no longer located in the danger zone; determining if the tag has entered a caution zone; if the tag is located in the caution zone, then clearing the danger zone alarm; if the tag has not been located in the caution zone or the danger zone, then; maintaining the danger zone alarm.

7 Claims, 4 Drawing Sheets

(58) Field of Classification Search
USPC ........................................................ 340/686.5
See application file for complete search history.

(56) References Cited

U.S. PATENT DOCUMENTS

| | | | | |
|---|---|---|---|---|
| 8,115,650 | B2 * | 2/2012 | Dasilva | F16P 3/141 340/572.1 |
| 2009/0109049 | A1 * | 4/2009 | Frederick | F16P 3/147 340/686.6 |
| 2011/0025964 | A1 * | 2/2011 | Nanmatsu | G02F 1/133634 349/117 |

FOREIGN PATENT DOCUMENTS

| | | |
|---|---|---|
| KR | 10-2190271 | 12/2020 |
| WO | 2021175403 | 9/2021 |

* cited by examiner

ENHANCED PROXIMITY ALERT SYSTEM AND METHOD

FIELD OF THE INVENTION

The invention relates to safety protocols, and systems to ensure such protocols as they apply to personnel proximate to spreaders and containers during loading and unloading.

BACKGROUND

Being a heavy equipment handling heavy load, human safety is always a concern for spreader, not only during operation, but also when the spreader is under maintenance.

During operation, crane operator may operate the crane from the crane cabin, which is high up in the crane, or from a remotely located control room via camera. Considering the high level of activities and the wide operation zone, it is not possible for the crane operator to notice every presence of human being within the spreader operation zone at all time. Which will eventually lead to accident such as spreader or container hitting or crushing down on people, resulting in serious injury/fatality.

During maintenance, such as when the spreader is in the maintenance workshop, it is common to have multiple maintenance workers working on and around the spreader. Activation any mechanisms on the spreader while these workers are still on or around the spreader could result in serious injury or fatality.

A Proximity Alert System (PAS) is generally the term used for a system that warns industrial vehicles that they are in close proximity to a pedestrian worker. It can be fitted on forklifts, reach stackers, gantry cranes etc—if these vehicles work near pedestrians, they need a warning system.

PAS is designed to enhance workplace safety by reducing risk of collision through asset and personnel detection and warning. The system may incorporate one or more detection technologies (RFID, UWB, GPS, Electromagnetic sensors, and (optional) real-time video surveillance) for redundancy and safety to detect user defined Heavy Vehicles, Light Vehicles, Personnel and Obstacles.

PAS is typically a bilateral alarm system, both pedestrians and drivers can be aware and being alerts of hazardous situation such as via audible and visual alert.

Active tags are worn by personnel, fitted to assets or setup around walkways, crossings and hazards. They are identified by the detection system, which may be mounted on a fixed location or on vehicle, when entering the detection zone.

This triggers an audible or/and visual alert, warning vehicle operators of the tag's close proximity to the vehicle.

Standard PAS technology when apply to spreader, has some limitations which need to be overcome. In contrast to ground vehicle, Spreader operation involve hoisting, which lift spreader through a 3D space. This create a new issue which is not present in truck mount PAS system. When a spreader is lifting a container, the container block off the zone directly under the container from the spreader mounted PAS. No current state of sensing technology, even relatively promising technology such as UWB, are able to detect personal directly under container.

SUMMARY OF INVENTION

In a first aspect the invention provides A method for detecting whether a tag is proximate to a spreader, the method comprising the steps of: detecting the tag by a sensing device mounted to the spreader; locating the tag in a danger zone relative to the spreader, and then; activating a danger zone alarm to an operator of the spreader; if the tag is no longer located in the danger zone; determining if the tag has entered a caution zone; if the tag is located in the caution zone, then clearing the danger zone alarm; if the tag has not been located in the caution zone or the danger zone, then; maintaining the danger zone alarm.

In a second aspect the invention provides a system for detecting whether a tag is proximate to a spreader, the system comprising: one or more sensing devices arrange to detect the tag by a sensing device mounted to the spreader; said one or more sensing devices in communication with a control system; said sensing devices arranged to locate the tag in a danger zone relative to the spreader; said control system, on receipt of a signal from the one or more sensing devices, arranged to activate a danger zone alarm; the control system further arranged to clear the danger zone alarm if the sensing devices detect the tag has entered a caution zone; if the sensing devices no longer detect the tag in either the danger zone or caution zone, the control system is arranged to maintain the danger zone alarm.

BRIEF DESCRIPTION OF DRAWINGS

It will be convenient to further describe the present invention with respect to the accompanying drawings which illustrate possible arrangements of the invention. Other arrangements of the invention are possible, and consequently the particularity of the accompanying drawings is not to be understood as superseding the generality of the preceding description of the invention.

DETAILED DESCRIPTION

For a PAS, RFID and UWB technology are some of the more common choices as they possess many desirable characteristics of PAS system, such as those listed below:

- 360 Degree Detection
- Single or Multiple Detection Zones
- Long Detection Range
- Detection with Regardless of Obstruction, blind spots or poor visibility
- Event Data and Logging With the capability of programming two distinct 360° detection zones (Warning/Danger), a system according to the present invention may be configured to trigger audible and visual alerts to warn operators of the presence of personnel, further allowing for staged warning and vehicle slowdown (vehicle compatibility check required).

In one embodiment, the system may include sensing devices such as UWB (Ultra WideBand) sensing devices that are mounted at appropriate locations on the spreader. Workers that need to be in the spreader operation zone or maintenance zone will wear a personal tag that could be detected by the PAS sensing device.

The sensing device is capable of setting up at least 2 zones around the spreader, the Caution Zone and Danger Zone.

Essentially the system may alarm the operator when it detects a person/tag in Caution Zone, but allowing spreader movement/operation to continue. In contrast, detection of a person/tag in the Danger Zone may prevent the activation of any spreader movement and halt the movement even if it has been started.

Beyond the Caution Zone, which may be within or beyond the PAS detection range, could be presumed or defined as 3rd zone which is the safe zone, where no alarm will be raise and operations allow to go on.

Figure 1:
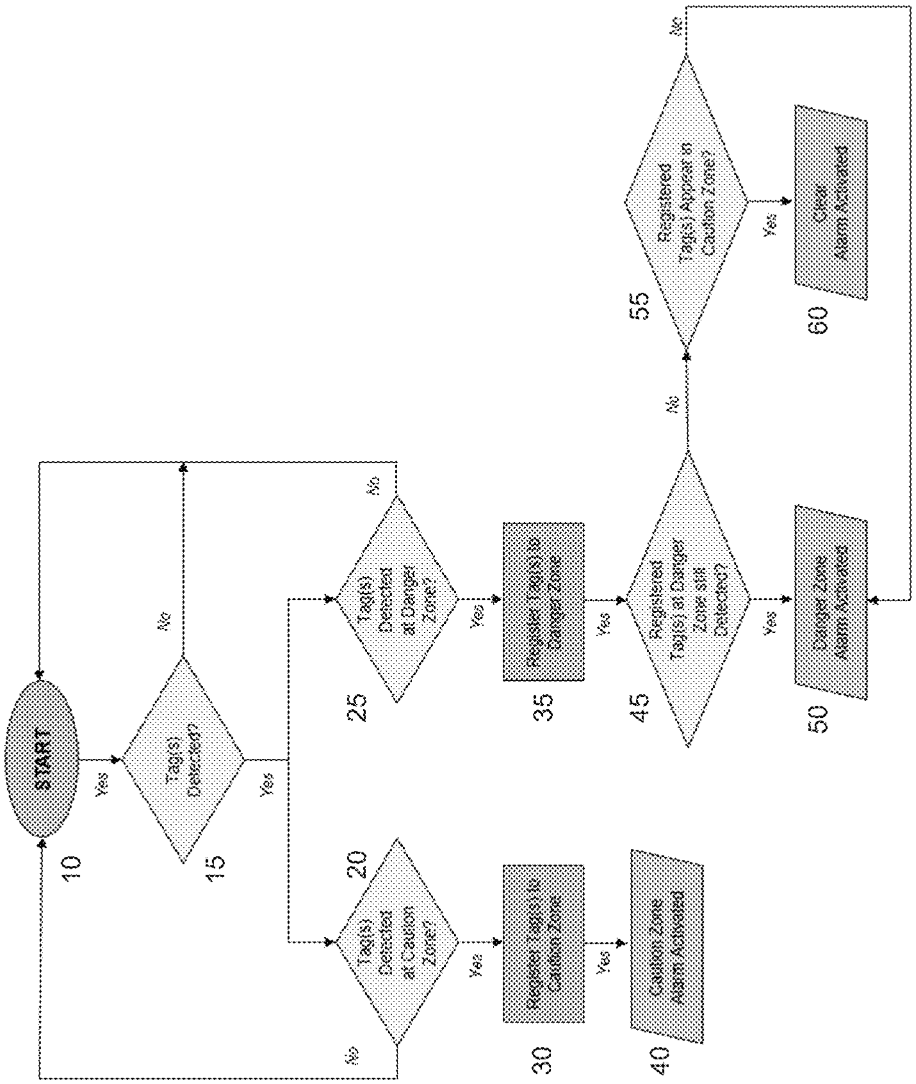
FIG. 1 is a flow chart according to one embodiment of the present invention.
Figure 3:
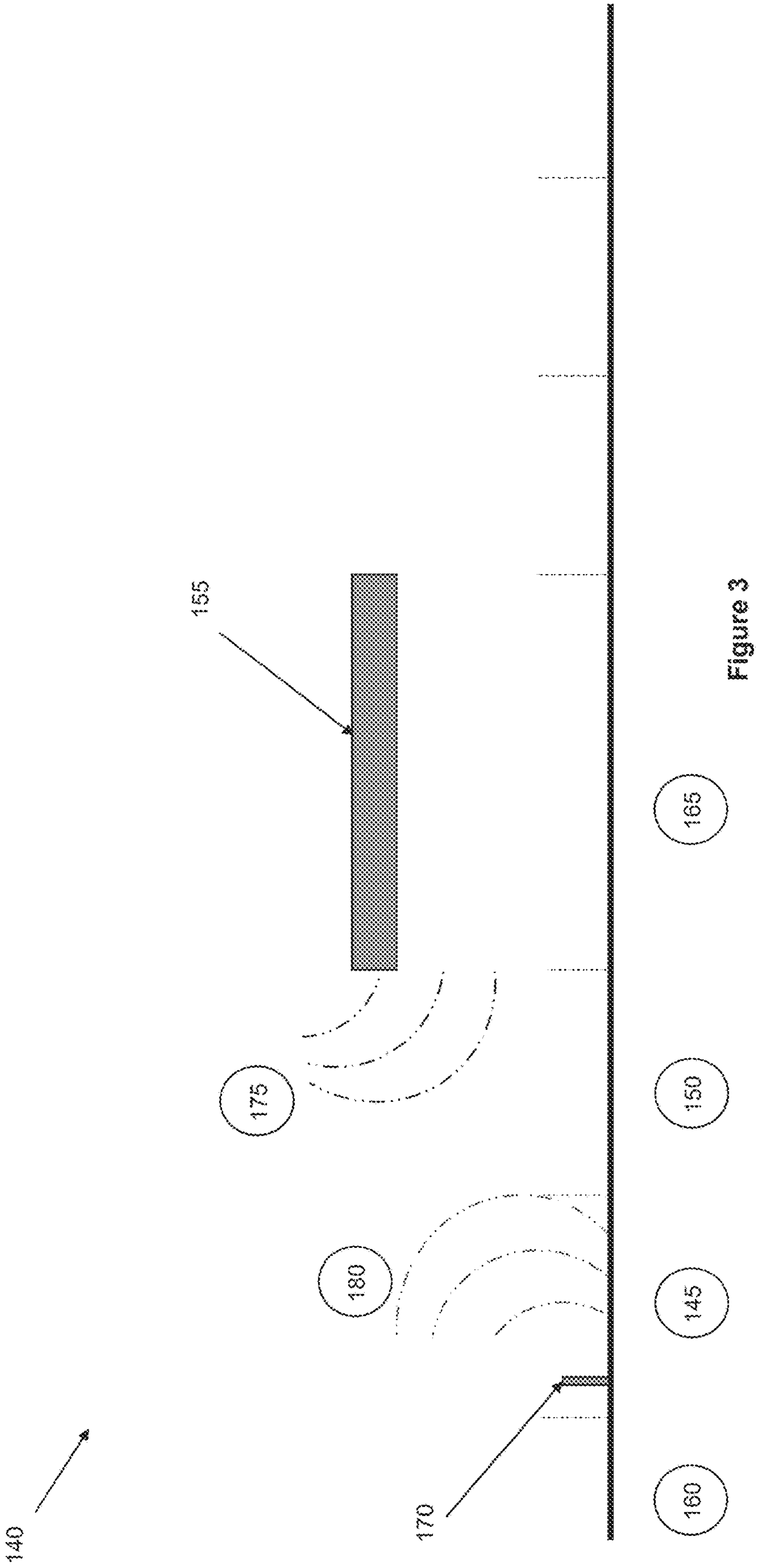
FIG. 3 a schematic elevation view according to a further embodiment of the present invention.

FIG. 1, and with reference to FIG. 3, provides a flow chart for the system. With regard to FIG. 3, the PAS 140 according to one embodiment of the present invention defines four separate zones, with an external zone 160 outside the detection range. The second and third zones 145, 150 are respectively the caution and danger zones, with a fourth zone 165 being directly below the spreader 155. A person 170 having a tag may provide an interrogation response 180 to an interrogation signal 175 transmitted from the spreader 155. The implications of that response, and where it is sent from, forms the basis for the system according to the present invention.

Returning to FIG. 1, this shows one embodiment whereby, on starting 10 the system, all tags within range are detected 15. The tags are various located within ether the caution zone 20 or the danger zone 25. If none are detected, the system continues to interrogate the detection range for tags entering either zone.

For the tags located within the caution zone 30 a caution zone alarm is activated, but no further action is taken. Thus, the spreader will continue to operate. For the tags located in the danger zone 35, the system will continually interrogate 45 to confirm whether the tagged person is still within the danger zone. If they are, then the danger zone alarm will trigger 50. If instead the tag is located within the caution zone 55 then the alarm will be cleared 60. However, if the tag is no longer found within the danger zone and is not within the caution zone 55, the risk that the tagged person is proximate to the spreader is such that the danger zone alarm is activated 50.

In principle, the system according to the present invention will keep track of the number of people (tag) in the caution and danger zones. Any detection of a person that has left the danger zone, the same person has to be detected entering the caution zone, otherwise it will be considered he has gone under the container (or any blind spot within the danger zone) and hence will be considered to be still within the danger zone.

It will be appreciated that, by identifying the tag is proximate to the spreader may, in some embodiments, include the tag is under the spreader. In a further embodiment, being proximate to the spreader may be limited to only those situations where the tag, and consequently the person, is beneath the spreader. It will be appreciate that, the demarcation between the danger zone and being under the spreader may vary with:

i) Environmental conditions;
ii) Container type;
iii) Signal strength etc.

As such, a grey zone between the danger zone and "under the container" may exists. To this end, proximate may include only "under the container" or also in such a grey zone.

Figure 2:
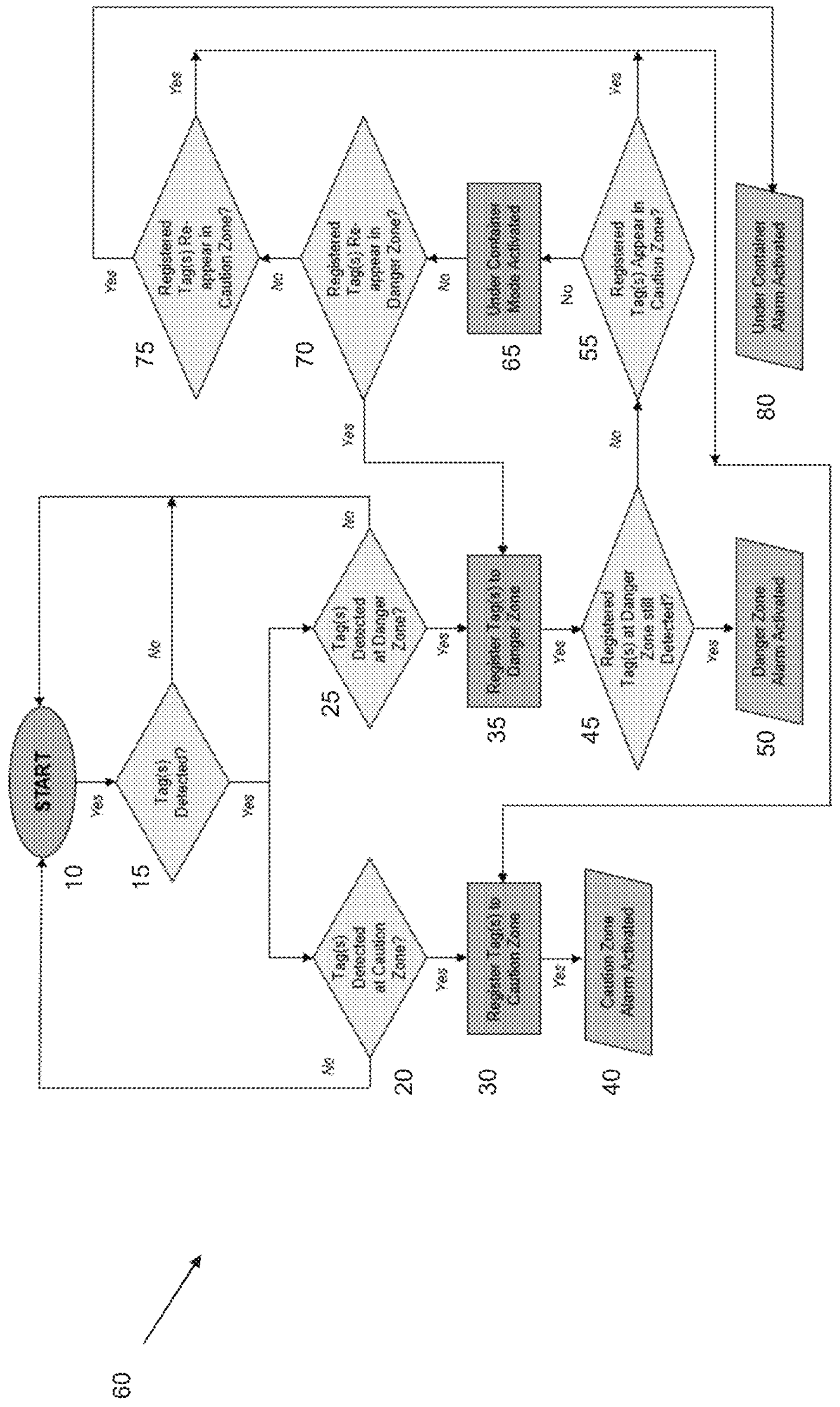
FIG. 2 is a flow chart according to a further embodiment of the present invention.

FIG. 2 shows a further embodiment, which adds an "Under Container Mode" to the system of FIG. 1. After interrogating the system 55 to determine whether the tag from the danger zone has emerged into the caution zone, if the tag is not detected in the caution zone, the "under container mode" is activated 65. A further interrogation determines whether the tag has reappeared in the danger zone 70 or the caution zone 75. If yes, the respective response is to place the system back into the normal operation of interrogating the respect zone 30, 35. If not, a separate Under Container Alarm is triggered 80, halting operation of the spreader.

It will be appreciated that the sensing device(s) are in communication with a control system for locating and determining the location of the tag, and the subsequent actions of activating the danger zone or under-container alarms, as well as stopping operation of the spreader. In a further embodiment, stopping operation of the spreader may be under the control of an operator, who may be free to act on being aware of the alarms.

Figure 4:
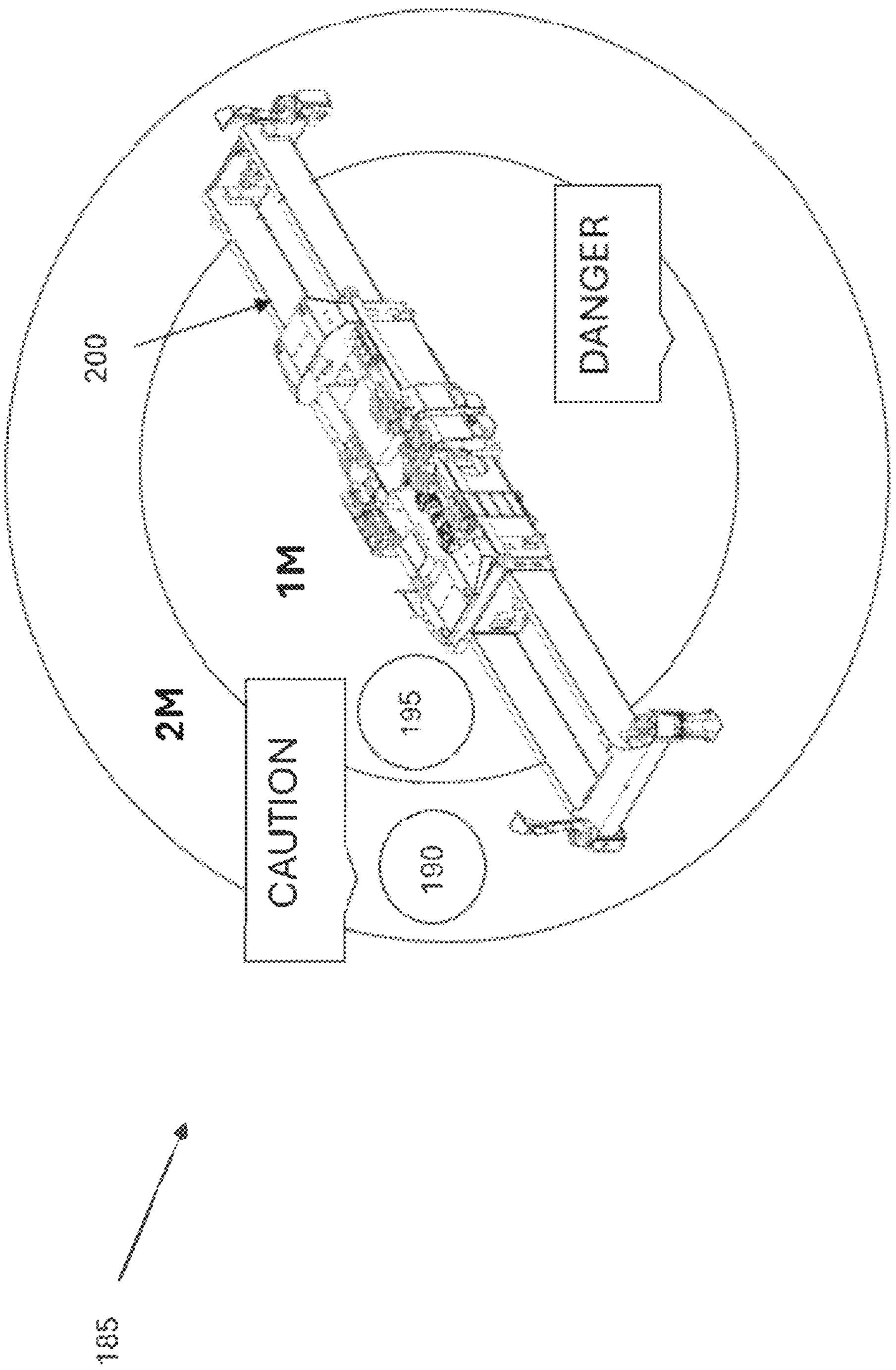
FIG. 4 is an isometric view according to a further embodiment of the present invention.

FIG. 4 shows a schematic view of a maintenance workshop 185. A spreader 200 is typically placed on a maintenance stand and power up and controlled by a spreader test panel. The test panel is used to control the movement of mechanisms within the spreader as required for inspection, maintenance, and testing.

The system according to the present invention is commenced to ensure safety protocols are met within the workshop. The respective caution zone 190 and danger zones 195 are established, possibly in terms of distance from the spreader 200.

In this case, as the spreader is already placed on a stand, it isn't possible to have an "under container" situation. Nevertheless, the process steps of FIG. 1 may still be used to ensure that the respective alarms are triggered should a tag enter the respective zones.

Once spreader is connected to a dedicated test panel, the PAS system will auto switch detection mode from Operation to Maintenance.

For the maintenance system 185, the Danger Zone 195 is defined to be the centre zone that encompasses the area within the spreader plus the area immediately around (e.g. 1 m) the spreader. As for the Caution Zone 190, it may be a ring next to the Danger Zone, for example it may start after 1 m and end at after 2 m around spreader. Beyond the Caution Zone 190, any detection will only for reference and no action will be taken by the system.

The invention claimed is:

1. A method for detecting whether a tag is proximate to a spreader, the method comprising:

detecting the tag by a sensing device mounted to the spreader;

locating the tag in a danger zone relative to the spreader, and then activating a danger zone alarm to an operator of the spreader;

if the tag is no longer located in the danger zone, determining if the tag has entered a caution zone;

if the tag is located in the caution zone, then clearing the danger zone alarm; and if the tag has not been located in the caution zone or the danger zone, then maintaining the danger zone alarm.

2. The method according to claim 1, further including, after maintaining the danger zone alarm, clearing the danger zone alarm if the tag is subsequently located in the caution zone.

3. The method according to claim 1, further including, after maintaining the danger zone alarm:

commencing an under container mode;

determining whether the tag is within the danger zone;

if not in the danger zone, determining if the tag is in the caution zone; and if not in the danger zone or caution zone, then activating an under-container alarm.

4. The method according to claim 1, wherein activation of the danger zone alarm includes stopping operation of the spreader.

5. The method according to claim 3, wherein activation of the under-container alarm includes stopping operation of the spreader.

6. A system for detecting whether a tag is proximate to a spreader, the system comprising:

one or more sensing devices arrange to detect the tag by a sensing device mounted to the spreader;

said one or more sensing devices in communication with a control system;

said sensing devices arranged to locate the tag in a danger zone relative to the spreader;

said control system, on receipt of a signal from the one or more sensing devices, arranged to activate a danger zone alarm;

the control system further arranged to clear the danger zone alarm if the sensing devices detect the tag has entered a caution zone; and if the sensing devices no longer detect the tag in either the danger zone or caution zone, the control system is arranged to maintain the danger zone alarm.

7. The system according to claim 6, wherein the control system is arranged to commence an under container mode if, subsequently, the tag cannot be detected in either the danger zone or the caution zone;

said control system then arranged to activate an under-container alarm.

* * * * *